United States Patent Office 3,795,673
Patented Mar. 5, 1974

3,795,673
PROCESS FOR PRODUCING BENZODIAZEPINE
DERIVATIVES
Kanji Meguro, Hyogo, Hiroyuki Tawada, Kyoto, and
Yutaka Kuwada, Hyogo, Japan, assignors to Takeda
Chemical Industries, Ltd., Osaka, Japan
No Drawing. Continuation of abandoned application Ser.
No. 68,486, Aug. 31, 1970. This application Aug. 30,
1972, Ser. No. 284,989
Claims priority, application Japan, Sept. 1, 1969,
44/69,153
Int. Cl. C07d 53/06, 99/04
U.S. Cl. 260—239 BD
4 Claims

ABSTRACT OF THE DISCLOSURE

A process for producing a compound of the general formula

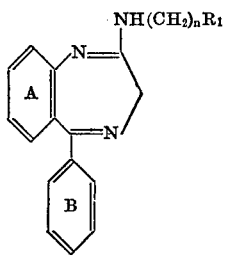

or the corresponding 4 N-oxide thereof wherein $n$ represents an integer of 1 to 3 inclusive, and $R_1$ represents hydrogen, alkoxy, dialkoxy, alkylamino, dialkylamino, alkoxycarbonyl or furyl, and the rings A and B independently are unsubstituted or substituted by one or more of the same or different substituents from the group of nitro, trifluoromethyl, halogen, alkyl or alkoxy, is provided.

A compound of the general formula

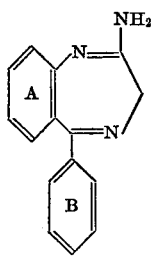

or the corresponding 4 N-oxide thereof wherein rings A and B are unsubstituted or substituted as indicated above or the corresponding 4 N-oxide thereof is reacted with a compound of the general formula

$$R_1(CH_2)_nNH_2$$

wherein $R_1$ and $n$ have the same meanings as defined above. The final product compounds are useful as tranquilizers.

---

This is a continuation of application Ser. No. 68,486, filed Aug. 31, 1970, now abandoned.

This invention relates to a novel and useful process for the production of a benzodiazepine derivative of the general formula

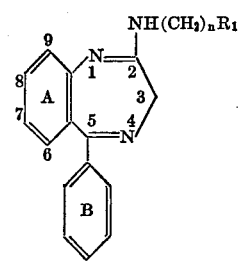

or the corresponding 4 N-oxide thereof wherein $n$ is an integer of 1 to 3 inclusive, $R_1$ is hydrogen, hydroxy, alkoxy, dialkoxy, alkylamino, dialkylamino, alkoxycarbonyl or furyl, and the rings A and B independently are unsubstituted or substituted by one or more of the same or different substituents from the group of nitro, trifluoromethyl, halogen, alkyl or alkoxy.

The process of this invention comprises allowing a 2-aminobenzodiazepine derivative of the general formula

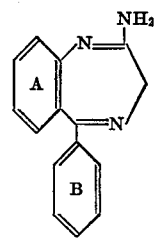

or the corresponding 4 N-oxide thereof wherein the rings A and B have the same meaning as above, to react with a primary amine of the general formula

$$NH_2(CH_2)_nR_1 \qquad (III)$$

wherein $n$ and $R_1$ have the same meaning as above.

Referring to the General Formulae I and II, the halogen substituted on the rings A and/or B includes chlorine, fluorine, bromine and iodine, the alkyl substituted on the rings A and/or B is preferably lower alkyl (e.g., methyl, ethyl, propyl) and the alkoxy substituted on the rings A and/or B is preferably lower alkoxy (e.g., methoxy, ethoxy).

The group illustrated by $(CH_2)_nR_1$ in the General Formulae I and III is exemplified by lower alkyl (e.g., methyl, ethyl, propyl), hydroxy lower alkyl (e.g., hydroxyethyl, hydroxypropyl), lower alkoxy lower alkyl (e.g., methoxyethyl, methoxypropyl, ethoxyethyl, ethoxypropyl), di-(lower alkoxy) lower alkyl (e.g., dimethoxyethyl, dimethoxypropyl, diethoxyethyl, diethoxypropyl), lower alkyl amino lower alkyl (e.g., methylaminoethyl, methylaminopropyl, ethylaminoethyl, ethylaminopropyl), di-(lower alkyl) amino lower alkyl (e.g., dimethylaminoethyl, dimethylaminopropyl, diethylaminoethyl, diethylaminopropyl), lower alkoxy carbonyl lower alkyl (e.g., methoxycarbonylmethyl, ethoxycarbonylmethyl, ethoxycarbonylpropyl) and furyl lower alkyl (e.g., furfuryl).

The benzodiazepine derivatives of the General Formula I are very important as tranquilizers.

Regarding the preparation of these useful compounds, the following processes are known.

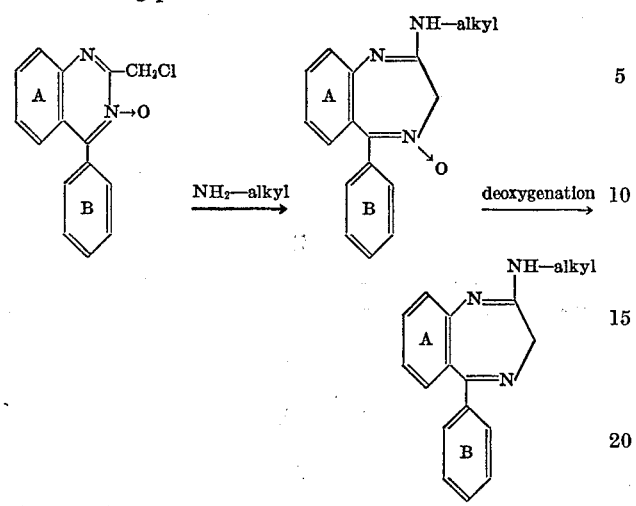

(J. Org. Chem. 26, 1111 (1961) and ibid., 26, 4488 (1961).)

(b)

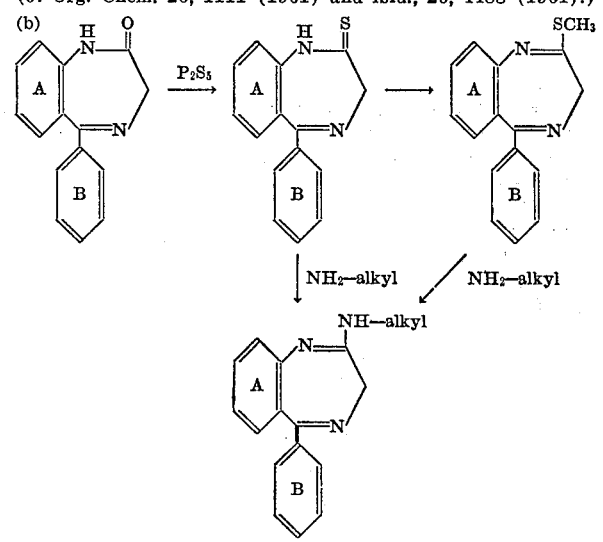

(J. Org. Chem. 29, 231 (1964).)

(c)

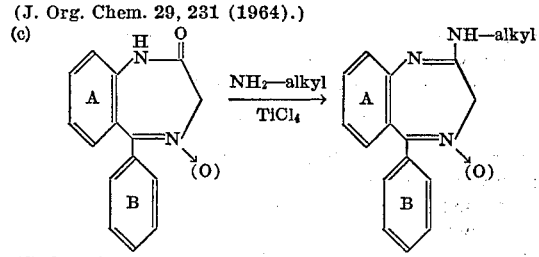

(J. Org. Chem. 34, 1143 (1969).)

The method (a) is the most common reaction and is known to give the object compounds in considerable yield when a simple lower alkylamine is used. The yield, however, is often lowered by a side reaction, particularly when the amine has a functional group such as hydroxy or alkoxy group in the alkyl chain. The yield also depends on the kind of the substituent of rings A and/or B. The by-product produced by such a side reaction is a quinazoline 3-oxide derivative of the general formula

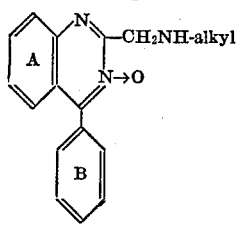

The method (b) is unpractical from the industrial point of view, because the yield of the first step is rather low. Furthemore, this method cannot be applied to the 4 N-oxide derivative.

The method (c) is a unique one-step reaction but the application of this method is confined within narrow limits, because the yield widely varies depending on the kind of the substituent of the ring A and the amine used, and in most cases, the yield is rather low.

Under these circumstances, the present inventors have found a very simple and useful method for the production of the benzodiazepine derivatives (I). This invention has been completed by the particular and unexpected finding that the amino group at the 2-position of the starting Compounds II can be substituted in high yield by various primary amines shown by the General Formula III. This method is widely applicable to 2-aminobenzodiazepine derivatives (II) independently of their structures.

As shown above, in the present method, the Compound II is allowed to react with the Compound III.

The reaction is conducted preferably in the presence of a solvent and an acid as a catalyst.

The solvents to be used are preferably polar ones such as alcohols (e.g. methanol, ethanol, etc.), pyridine and dimethylformamide.

The acid employable in the reaction may be inorganic (e.g., hydrochloric acid, sulfuric acid, phosphoric acid, etc.), or organic, such as carboxylic acids (e.g. acetic acid, propionic acid, trifluoroacetic acid, etc.) and sulfonic acids (e.g. benzenesulfonic acid, p-toluenesulfonic acid, etc.).

The Compounds II and/or III may be used as a free amine or as a salt with an acid stated above.

When the Compound II and/or III is used as a salt with an acid, further addition of the acid is not necessarily required upon conducting the reaction.

The amount of the Compound III to be employed varies depending on the kinds of the Compounds II and III, the reaction conditions, etc., and is generally about 1 to about 10 moles, practically about 2 to about 5 moles per mole of the Compound II. An amount of the acid to be employed is generally about 1 to 10 moles, practically about 2 to about 5 moles, per mole of the Compound II.

The reaction temperature is generally around refluxing temperature of the reaction system, and may be optionally controlled to any degree.

The addition of imidazole compounds (e.g., imidazole, 2-methylimidazole, etc.) to the above reaction system may accelerate the reaction to give a good result. An amount of the imidazole compound to be used is generally 1 to 10 moles per mole of the Compound II.

The Compound I prepared by the present process can be isolated in the form of its free base or of its acid salt by per se conventional means, for example, by evaporating the solvent from the reaction system.

The acid with which the Compound I can form an acid salt may be inorganic (e.g., hydrochloric acid, sulfuric acid, etc.) or organic (e.g., acetic acid, toluenesulfonic acid, etc.).

The Compound I wherein the nitrogen atom at the 4-position forms oxide can be optionally subjected to deoxygenation with a deoxygenating agent (e.g. phosphorous trichloride, hydrogen and Raney nickel, etc.). On the contrary, the Compound I wherein the nitrogen atom at the 4-position does not form oxide, can be optionally converted to its oxide with an oxidizing agent (e.g. hydrogen peroxide, peracetic acid, pertrifluoro acetic acid, perbenzoic acid, etc.).

The Compound I as well as the acid salts are orally or parenterally administrable per se or in a suitable form such as powder, granules, tablets or injection solutions admixed with a pharmaceutically acceptable carrier or adjuvant. The dose of the Compound I or their acid salts to be administered varies depending on the kinds of the Compound I, severity of the disease, etc., and generally falls within a range of about 1 to about 30 milligrams upon oral administration, and about 0.5 to about 10 milligrams upon parenteral administration for human adult per day.

For further detailed explanation of the invention, the following examples are given, wherein the term "parts(s)" means "weight parts(s)", unless otherwise specified, and the relationship between "parts(s)" and "parts(s) by volume" corresponds to that gram(s) and milliliter(s).

EXAMPLE 1

A solution of 2.7 parts of 2-amino-7-chloro-5-phenyl-3H-1,4-benzodiazepine and 6.75 parts of methylamine hydrochloride in 120 parts by volume of ethanol is refluxed for 2.5 hours. Ethanol is evaporated under reduced pressure and water is added to the residue, whereby 7-chloro-2-methylamino - 5 - phenyl - 3H - 1,4-benzodiazepine is given as pale yellow crystals. Recrystallization of the crystals from acetone gives pale yellow prisms melting at 240 to 241° C.

Elementary analysis.—Calculated (percent): C, 67.72; H, 4.97; N, 14.81. Found (percent): C, 67.66; H, 5.05; N, 14.65.

EXAMPLE 2

A mixture of 3.4 parts of 2-amino-7-chloro-5-phenyl-3H-1,4-benzodiazepine dihydrochloride, 3.5 parts of ethanolamine and 100 parts by volume of methanol is refluxed for 3.5 hours, followed by evaporation of the solvent. The residue is extracted with chloroform. The chloroform layer is washed with water, dried over sodium sulfate and subjected to evaporation to remove chloroform. The residue is treated with ethanol to give crystals of 7-chloro-2-(2 - hydroxyethyl)amino - 5 - phenyl-3H-1,4-benzodiazepine. Recrystallization from ethyl ether gives colorless needles melting at 172 to 173° C.

Elementary analysis. — Calculated for $C_{17}H_{16}ClN_3O$ (percent): C, 65.07; H, 5.14; N, 13.39. Found (percent): C, 65.15; H, 5.02; N, 13.60.

EXAMPLE 3

A solution of 3.4 parts of 2-amino-7-chloro-5-phenyl-3H-1,4-benzodiazepine dihydrochloride and 3.76 parts of 3-aminopropanol in 100 parts by volume of methanol is refluxed for 4.5 hours. The solvent is evaporated and water is added to the residue, whereby 7-chloro-2-(3-hydroxypropyl)amino - 5 - phenyl-3H-1,4-benzodiazepine is given as pale yellow crystals. The crystals are washed with water, dried and recrystallized from ethyl acetate to give colorless needles melting at 203 to 205° C.

Elementary analysis.—Calculated for $C_{18}H_{18}ClN_3O$ (percent: C, 65.95; H, 5.53; N, 12.82. Found (percent): C, 65.85; H, 5.59; N, 12.91.

EXAMPLE 4

A solution of 3.4 parts of 2-amino-7-chloro-5-phenyl-3H-1,4-benzodiazepine dihydrochloride and 5.1 parts of N,N-dimethylaminopropylamine in 100 parts by volume of methanol is refluxed for 6 hours, followed by evaporation of methanol. Water is added to the residue and the mixture is extracted with chloroform. The chloroform layer is washed with water, dried over sodium sulfate and subjected to evaporation to remove chloroform. The residue is treated with n-hexane to give crystals of 7-chloro-2-(3-N,N-dimethylaminopropyl)amino-5-phenyl - 3H-1,4-benzodiazepine. Recrystallization from isopropyl ether gives colorless flakes melting at 159 to 160° C.

Elementary analysis.—Calculated for $C_{20}H_{23}ClN_4$ (percent): C, 67.69; H, 6.53; N, 15.79. Found (percent): C, 67.22; H, 6.23; N, 15.57.

EXAMPLE 5

A solution of 3.4 parts of 2-amino-7-chloro-5-phenyl-3H-1,4-benzodiazepine dihydrochloride and 4.8 parts of furfurylamine in 100 parts by volume of methanol is refluxed for 3 hours, followed by evaporation of the solvent. Water is added to the residue and the mixture is extracted with chloroform. The chloroform layer is washed with water, dried over sodium sulfate and concentrated. The concentrate is dissolved in n-hexane under heating and left standing, whereby crystals of 7-chloro-2-furfurylamino-5-phenyl-3H-1,4-benzodiazepine are given. Recrystallization from isopropyl ether gives colorless prisms melting at 150 to 151° C.

Elementary analysis.—Calculated for $C_{20}H_{25}ClN_3O$ (percent): C, 68.86; H, 4.33; N, 12.05. Found (percent): C, 68.47; H, 4.48; N, 11.96.

EXAMPLE 6

A mixture of 2.8 parts of 2-amino-7-chloro-5-phenyl-3H-1,4-benzodiazepine 4 N-oxide, 6.75 parts of methylamine hydrochloride and 250 parts by volume of methanol is refluxed for 13 hours. Methanol is evaporated and water is added to the residue, whereby crystals of 7-chloro-2-methylamino-5-phenyl-3H-1,4-benzodiazepine 4 N-oxide are precipitated. The crystals are dried and recrystallized from ethanol to give pale yellow crystals melting at 235 to 236° C.

EXAMPLE 7

A solution of 2.8 parts of 2-amino-7-nitro-5-phenyl-3H-1,4-benzodiazepine and 5.1 parts of N,N-dimethylaminopropylamine in 100 parts by volume of methanol is refluxed for 2 hours, followed by evaporation of the solvent. Water is added to the residue and the mixture is extracted with chloroform. The chloroform extract is washed with water, dried over sodium sulfate and subjected to evaporation to remove the solvent. The residue is treated with iso-propyl ether to give yellow crystals of 2-(3-N,N-dimethylaminopropyl)amino - 7 - nitro-5-phenyl-3H-1,4-benzodiazepine. Recrystallization from methanol gives pale yellow needles melting at 130 to 131° C.

Elementary analysis.—Calculated for $C_{20}H_{23}N_5O_2$ (percent): C, 65.73; H, 6.34; N, 19.17. Found (percent): C, 65.21; H, 6.27; N, 19.13.

EXAMPLE 8

A solution of 5.6 parts of 2-amino-7-nitro-5-phenyl-3H-1,4-benzodiazepine, 8.4 parts of glycine ethyl ester hydrochloride and 4.9 parts of 2-methylimidazole in 200 parts by volume of ethanol is refluxed for 1 hour, followed by evaporation of the solvent. Water is added to the residue and the mixture is extracted with ethyl acetate. The ethyl acetate layer is washed with water, dried over sodium sulfate and subjected to evaporation to remove the solvent, whereby crystals of 2-ethoxycarbonylmethylamino-7-nitro-5-phenyl-3H-1,4-benzodiazepine are given. Recrystallization from acetone-n-hexane gives pale yellow needles melting at 194 to 195° C.

Elementary analysis.—Calculated for $C_{19}H_{18}N_4O_4$ (percent): C, 62.28; H, 4.95; N, 15.29. Found (percent): C, 62.36; H, 4.96; N, 14.99.

EXAMPLE 9

A mixture of 1.35 parts of 2-amino-7-chloro-5-phenyl-3H-1,4-benzodiazepine, 50 parts by volume of ethanol, 2.1 parts of glycine ether ester hydrochloride and 1.23 parts of 2-methylimidazole is refluxed for 1.5 hours, followed by distillation to evaporate the ethanol. Water is added to the residue and the mixture is extracted with chloroform. The chloroform layer is washed with water, dried over sodium sulfate and distilled to evaporate the solvent. The residue is treated with isopropyl ether-n-hexane to give crystals of 7-chloro-2-ethoxycarbonylmethylamino-5-phenyl-3H-1,4-benzodiazepine. Recrystallization from n-hexane or isopropyl ether gives colorless needles melting at 97 to 98° C.

Elementary analysis.—Calculated for $C_{19}H_{18}ClN_3O_2$ (percent): C, 64.13; H, 5.10; N, 11.81. Found (percent): C, 64.43; H, 5.40; N, 11.25.

EXAMPLE 10

A mixture of 3.43 parts of 2-amino-7-chloro-5-phenyl-3H-1,4-benzodiazepine dihydrochloride, 5.63 parts of diethylaminoethylamine and 100 parts by volume of ethanol is refluxed for 3 hours, followed by distillation to evaporate the solvent. Water is added to the residue and the aqueous mixture is extracted with chloroform. The chloroform layer is washed with water, dried over sodium sulfate and distilled to evaporate the solvent, whereby 7-chloro-2-(2-diethylaminoethyl)amino - 5 - phenyl-3H-1,4-benzodiazepine is given as paste. The paste is then converted to its picrate. Recrystallization of the picrate from tetrahydrofuran-ethyl ether gives yellow crystals melting at 203 to 204° C.

*Elementary analysis.*—Calculated for $$C_{21}H_{25}ClN_4 \cdot 2(C_6H_3N_3O_7)$$

percent): C, 47.92; H, 3.78; N, 16.94. Found (percent): C, 48.22; H, 3.69; N, 16.95.

EXAMPLE 11

A mixture of 3.4 parts of 2-amino-7-chloro-5-phenyl-3H-1,4-benzodiazepine dihydrochloride, 4 parts of aminoacetaldehyde diethyl acetal and 100 parts by volume of ethanol is refluxed for 1 hour, followed by distillation to evaporate the solvent. Water is added to the residue and the aqueous mixture is extracted with ethyl acetate. The ethyl acetate layer is washed with water, dried over sodium sulfate and distilled to evaporate the solvent. The residue is treated with n-hexane to give 7-chloro-(2,2-diethoxyethylamino) - 5 - phenyl-3H-1,4-benzodiazepine as pale yellow crystals. Recrystallization from n-hexane gives pale yellow prisms melting at 125 to 127° C.

*Elementary analysis.*—Calculated for $C_{21}H_{24}ClN_3O_3$ (percent): C, 65.36; H, 6.27; N, 10.89. Found (percent): C, 65.61; H, 6.38; N, 11.19.

EXAMPLE 12

A similar procedure to that in Example 11 is conducted employing 2 - amino-5-phenyl-3H-1,4-benzodiazepine instead of the 7-chloro analogue, whereby 2-(2,2-diethoxyethylamino)-5-phenyl-3H-1,4-benzodiazepine is obtained as crystals. Recrystallization from n-hexane gives colorless prisms melting at 102 to 103° C.

*Elementary analysis.*—Calculated for $C_{21}H_{25}N_3O_2$ (percent): C, 71.77; H, 7.17; N, 11.96. Found (percent): C, 71.97; H, 7.14; N, 11.83.

EXAMPLE 13

A similar procedure to that in Example 11 is conducted employing 2 - amino-7-nitro-5-phenyl-3H-1,4-benzodiazepine instead of the 7-chloro analogue, whereby 2-(2,2-diethoxyethylamino)-7-nitro-5-phenyl - 3H - 1,4 - benzodiazepine is obtained as crystals. Recrystallization from ethyl ether-n-hexane gives pale yellow needles melting at 114 to 115° C.

*Elementary analysis.*—Calculated for $C_{21}H_{24}N_4O_4$ (percent): C, 63.62; H, 6.10; N, 14.13. Found (percent): C, 63.62; H, 6.02; N, 13.75.

What is claimed is:

1. A process for producing a compound of the formula

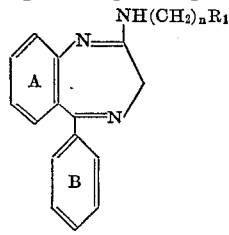

or the corresponding 5 N-oxide thereof wherein $n$ represents an integer of from 1 to 3 inclusive and $R_1$ represents hydrogen, hydroxy, lower alkoxy, di-(lower alkoxy)methyl, lower alkylamino, di-(lower alkyl) amino, lower alkoxy-carbonyl or furyl and the rings A and B independently are unsubstituted or substituted by one or more of the same or different substituents selected from the group consisting of nitro, trifluoromethyl, halogen, lower alkyl and lower alkoxy, which comprises reacting a compound of the formula

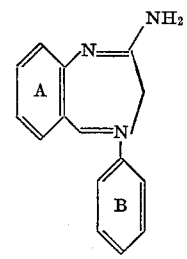

or the corresponding 4 N-oxide thereof wherein rings A and B are unsubstituted or substituted as indicated above with a compound of the formula

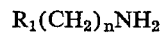

wherein $R_1$ and $n$ have the same meaning as defined above, in a solvent selected from the group consisting of methanol and ethanol at a temperature up to the reflux temperature of the reaction system.

2. The process according to claim 1 wherein the reaction is conducted in the presence of a solvent and an acid as catalyst and at a temperature which is about the refluxing temperature of the reaction ssytem.

3. The process according to claim 1 wherein an imidazole compound is added to accelerate the reaction.

4. The process according to claim 1 wherein the corresponding 4 N-oxide compound is employed.

References Cited

Houben-Weyl: "Methoden der Organischen Chemie," vol. 11/1 (Stuttgart, 1957), pp. 248–256 and 261.

Smith: "Open-Chain Nitrogen Compounds," vol. 1 (New York, 1965), p. 180.

Bruice et al.: Chem. Abstracts, vol. 63, col. 5485b (1965).

ALTON D. ROLLINS, Primary Examiner

U.S. Cl. X.R.

260—347.7; 424—244, 285